(12) United States Patent
Chiang et al.

(10) Patent No.: US 12,320,936 B2
(45) Date of Patent: Jun. 3, 2025

(54) COMBINED CONFIGURATION OF A FREE FIELD AND A REMOTE SIGNAL SOURCE, AND ITS EARTHQUAKE DETECTING SYSTEM

(71) Applicant: P-Waver Inc., Taipei (TW)

(72) Inventors: Hung-Wei Chiang, Taipei (TW); Pei-Yang Lin, Taipei (TW); Hsiu-Hsien Wang, Taipei (TW)

(73) Assignee: P-Waver Inc., Taipei (TW)

( * ) Notice: Subject to any disclaimer, the term of this patent is extended or adjusted under 35 U.S.C. 154(b) by 130 days.

(21) Appl. No.: 18/156,812

(22) Filed: Jan. 19, 2023

(65) Prior Publication Data
US 2024/0248224 A1 Jul. 25, 2024

(51) Int. Cl.
*G01V 1/01* (2024.01)

(52) U.S. Cl.
CPC ...................... *G01V 1/01* (2024.01)

(58) Field of Classification Search
CPC . G01V 1/01; G01V 1/162; G01V 1/18; G01V 1/307; G01V 2210/1232; G01V 1/003
See application file for complete search history.

(56) References Cited

U.S. PATENT DOCUMENTS

| | | | | |
|---|---|---|---|---|
| 6,462,549 B1 * | 10/2002 | Curtis | ............... | G01V 11/007 702/14 |
| 8,686,850 B2 * | 4/2014 | Zeng | ............... | G08B 21/10 340/539.1 |
| 11,714,207 B2 * | 8/2023 | Vancho | ............... | G01V 1/003 702/15 |

(Continued)

FOREIGN PATENT DOCUMENTS

| | | | | |
|---|---|---|---|---|
| CA | 3040089 A1 | * | 4/2018 | |
| CN | 1685377 A | * | 10/2005 | ............ G01V 1/008 |

(Continued)

OTHER PUBLICATIONS

Translation of CN-1685377 (Year: 2005).*

*Primary Examiner* — Daniel Pihulic
(74) *Attorney, Agent, or Firm* — Michael W. Taylor; Wolter, Van Dyke, Davis PLLC

(57) ABSTRACT

In the present invention, an earthquake detection system based on the combination configuration of a free field and remote signal source is provided. The earthquake detection system includes: a host; a main sensor arranged in a free field and connected to the host; and a plurality of backup sensors, which are remotely arranged with respect to the main sensor, wherein each of the backup is connected to the host via the internet and transmits a remote signal to the host so as to avoid misjudging the occurrence of earthquakes because of unnatural factors, and prevent the vibration caused by human activities from interfering with the detector. The earthquake detection system achieves the effect of verification through a plurality of sensors installed in different positions. Only when all the sensors confirm that there is an earthquake, an earthquake warning will be issued to the protected place, and two sensors set in different environments can be used to avoid the deficiency that the two sensors misjudge at the same time due to the same kind of interference that the two sensors may receive in the same environment.

8 Claims, 7 Drawing Sheets

(56) References Cited

U.S. PATENT DOCUMENTS

| | | | |
|---|---|---|---|
| 11,887,171 B2 * | 1/2024 | Bango | H04L 67/52 |
| 2019/0033476 A1 * | 1/2019 | O'Malley | G06F 17/17 |
| 2023/0314641 A1 * | 10/2023 | Chou | G01V 1/01 |
| | | | 702/15 |
| 2024/0248221 A1 * | 7/2024 | Lin | G01V 1/284 |
| 2024/0248222 A1 * | 7/2024 | Chiang | G01V 1/18 |
| 2024/0248223 A1 * | 7/2024 | Chiang | G01V 1/01 |
| 2024/0248224 A1 * | 7/2024 | Chiang | G01V 1/01 |
| 2024/0248227 A1 * | 7/2024 | Lin | G06N 3/08 |
| 2024/0249610 A1 * | 7/2024 | Lin | G08B 27/005 |

FOREIGN PATENT DOCUMENTS

| | | | | |
|---|---|---|---|---|
| CN | 100495459 C | * | 6/2009 | G01V 1/008 |
| CN | 201716812 U | * | 1/2011 | |
| CN | 205281725 U | * | 6/2016 | |
| CN | 110376641 A | * | 10/2019 | G01V 1/008 |
| CN | 110383894 B | * | 7/2021 | H04W 48/02 |
| CN | 108476546 B | * | 11/2021 | H04W 28/02 |
| CN | 108476534 B | * | 4/2022 | H04W 4/70 |
| CN | 110140421 B | * | 4/2022 | H04W 36/00698 |
| EP | 4017041 B1 | * | 9/2023 | H04W 12/08 |
| JP | 2015001494 A | * | 1/2015 | |
| TW | I553327 | | 11/2015 | |
| TW | I541528 | | 7/2016 | |
| TW | 645903 U | * | 9/2023 | |
| TW | 645920 U | * | 9/2023 | |

* cited by examiner

COMBINED CONFIGURATION OF A FREE FIELD AND A REMOTE SIGNAL SOURCE, AND ITS EARTHQUAKE DETECTING SYSTEM

FIELD OF THE INVENTION

The present invention is related to earthquake detection, particularly to an earthquake detection method and apparatus utilizing a plurality of sensors, and more particularly to an earthquake detection method and apparatus applied to a field where there is a large-scale non-natural, non-earthquake vibration resulting from, e.g. rails.

BACKGROUND OF THE INVENTION

Most natural disasters such as typhoons, volcanic eruptions, etc., can be predicted from several hours to several days in advance. However, currently, an earthquake cannot be predicted, and there is often no sign thereof until it happens. There have been attempts to conduct a proper detection at the beginning of the earthquake to reduce the damage. The earthquake waves, according to their velocities, can be classified into "P waves", "S waves", etc., in order of decreasing velocities. Specifically, the S wave is more destructive but travels at a slower velocity, and thus is the slowest one to hit the ground surface (i.e., the free field). On the other hand, the P wave which has a small amplitude and is less destructive travels at a faster velocity and thus is the fastest one to arrive at the free field. Therefore, to be warned of the earthquake in advance, the earthquake detection gauge can be used to detect the earthquake waves to issue an earthquake early warning, so that the relevant personnel can take appropriate measures before serious damages happen. The specific prediction method is to take advantage of the P wave's properties of having the fastest wave velocity and then to predict the S wave which will arrive later. Nowadays, the prevalent earthquake early warning or sensing systems are mainly classified into a regional type and an on-site type. The main principle of the regional type is based on the basic earthquake location determination and the way to determine the scale. The technique of the "regional earthquake early warning" can reduce the time length for issuing the warning to be within 20 seconds. The early warning measures of the on-site earthquake early warning system are to utilize the information within several seconds after the seismic observation station set up in a specified place is triggered to determine the destructive level of the earthquake in real-time and issue warning messages to the local inhabitants. Typically, this mode depends on the trigger signal from an individual station, and thus can effectively reduce the cost for the early warning setup, and reduce the range of the early warning blind zone.

However, because of the ground surface vibrations resulting from human activities (such as the running person, the vehicle passage, the operations in the construction site, or the operations in the heavy industry plant), the earthquake gauge can often erroneously determine that an earthquake has occurred. Accordingly, one of the current research directions also includes how to prevent the non-natural factors from causing the earthquake detection gauge to make an erroneous determination. The prior art, such as Taiwan Patent No. 1541528, discloses the arrangement of sensors, but does not disclose the prerequisites to utilize the arrangement and the field that the arrangement can be applied to. Additionally, the prior art does not disclose the remote signal source from which the backup sensor signal of the local (on-site) earthquake detection system may originate, and thus the effect on preventing the erroneous determination would be limited. Moreover, if other sensors fail or cannot transmit any signals, the possibility of making an erroneous determination is increased. Taiwan Patent No. 1553327 proposes a scheme taking into account the condition where the human activities cause the earthquake gauge to make an erroneous determination. However, in this scheme, the solution is to make a determination based on a single earthquake threshold, and thus the scheme will still be apt to make an erroneous determination if there are several types of non-natural vibrations in the field.

Therefore, the aim of the present invention is to provide an earthquake detection system to particularly plan for various places to be protected. Accordingly, the applicant has expended much effort to provide an invention based on "a combined arrangement of a free field and a remote signal source and its earthquake detection system" to avoid any erroneous determination resulting from ground vibrations due to non-natural factors, so as to improve the accuracy of the earthquake determination.

SUMMARY OF THE INVENTION

In order to avoid the condition of erroneously determining that an earthquake occurs due to the non-natural factors and to prevent the vibration caused by the human activities from interfering with the detection gauge, the present invention utilizes a plurality of sensors installed in different places to make re-checks. Only when each sensor determines that there is an earthquake, an earthquake warning is issued to the area to be protected. Sensors are set up in two different environments to avoid the drawback where the two sensors in the same environment might suffer from the same interference and thus make the erroneous determination at the same time. "The combined arrangement of the free field and the remote signal source and its earthquake detection system" according to the present invention can be further utilized for the condition that the rail transportation site or field lacks a suitable environment where the wired backup sensors can be installed. The non-suitable environment is characterized in that the vibrations in the field are more frequent than the vibrations caused in the factory. The mode of the vibrations in the field is different from that in the factory. For example, the vibrations caused by the rail vehicle can travel up to a distance of one to two kilometers. Therefore, even if the sensor in the free field is horizontally ten or more meters away from the rail, it is still possible that there is the erroneous determination resulting from an interference. Sensors arranged in two different environments can avoid the drawback where it is possible that two sensors in the same environment suffer from the same interference. Accordingly, the present invention optimizes the configuration of the sensor locations for such environments. In addition to the sensor arranged in the free field, there are sensors arranged remotely. That is, the sensor signal from a remote end is received via an internet connection. The sensor signal can come from an individual sensor having a communication interface to transmit the remote signal to the local on-site host via the internet. The sensor signal coming from the remote end represents a measurement value. Alternatively, the sensor signal can come from another earthquake detection system at a remote end and this sensor signal can serve as a trigger signal. Therefore, the present invention utilizes the remote sensing operation to greatly prevent the on-site sensor in the free field from making an erroneous determination as a result of non-earthquake, non-natural or artificial interferences, so as to improve the detection accuracy and reduce the cost waste (e.g. the time cost) resulting from, for example, trains being suspended from service due to an erroneous determination.

To achieve the objective above, the present invention provides an earthquake detection system based on the combined arrangement of a free field and a remote signal source, comprising: a host; a main sensor set up in a free field and connected to the host; and a backup earthquake detection system remotely set up with respect to the main sensor, connected to the host via an internet, and transmitting a remote signal to the host.

To achieve the objective above, the present invention further provides an earthquake detection system based on the combined arrangement of a free field and a remote signal source, comprising: a host; a main sensor set up in the free field and connected to the host; and a plurality of backup sensors remotely set up with respect to the main sensor, wherein each of the backup sensors is connected to the host via an internet and transmits a remote signal to the host.

To achieve the objective above, the present invention further provides a combined arrangement of a free field and a remote signal source applied to an earthquake detection system, comprising: a main sensor set up in a free field as a free field sensor; and a remote signal source set up at a remote end, and outputting a remote signal via an internet, wherein a sensing signal of the main sensor and the remote signal both arrive at the same receiving device.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of the preferred embodiments of this invention are presented herein for the purposes of illustration and description only; they are not intended to be exhaustive or to be limited to the precise form disclosed.

In the present disclosure, an on-site earthquake early warning station may include a sensor and a computing module.

Figure 1:
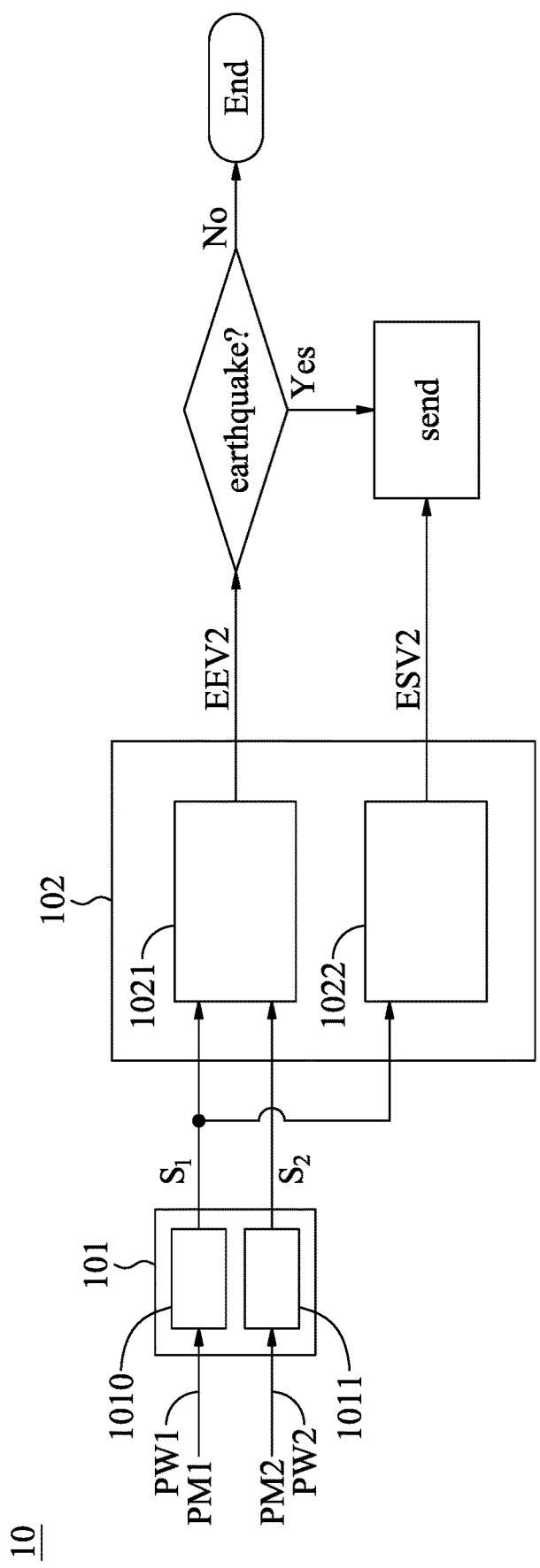
FIG. 1 is a schematic diagram of a single execution of an on-site system for determining earthquakes and estimating the seismic wave intensity according to a preferred embodiment of the present invention.

Please refer to FIG. 1, which is a schematic diagram of a single execution of an on-site system for determining earthquakes and estimating the seismic wave intensity according to a preferred embodiment of the present disclosure (that is, in fact, monitoring and estimation can be performed continuously and repeatedly in real time). The system 10 includes an earthquake detection configuration 101 and a computing module 102. The earthquake detection configuration 101 detects vibration waves PW1/PW2 at different locations in the same area. According to one embodiment, the earthquake detection configuration 101 includes a main sensor 1010 and a backup sensor 1011 located at different detection locations. Wherein, the backup sensor mentioned in this disclosure can be designed to increase the decision-making accuracy of the earthquake detection system, and in some embodiments, it can also be used when the main sensor fails to replace the function of the main sensor.

Those skilled in the art understand that when an earthquake occurs, the main sensor 1010 and the backup sensor 1011 disposed at different locations in the same area will sense vibrations at almost the same time. The main sensor 1010 and the backup sensor 1011 generate the first signal S1 and the second signal S2 in response to the first vibration wave PW1 and the second vibration wave PW2, generated by the first vibration event PM1 and the second vibration event PM2 respectively. These signals are simultaneously sent to the computing module 102. The main sensor 1010 described here is mainly used to detect various vibrations caused by earthquakes, such as longitudinal waves or transverse waves, and the second signal S2 of the backup sensor 1011 can be used to determine whether the first vibration wave PW1 detected by the main sensor 1010 is generated by the same seismic event. According to different embodiments, the backup sensor 1011 may include a set of sensing elements (not shown), which do not depart from the scope of the present invention.

According to an embodiment, the computing module 102 includes a determining module 1021 and a prediction module 1022. The determining module 1021 receives the first and second signals S1/S2, and determines whether there is an earthquake event accordingly. Those skilled in the art can understand that when an earthquake occurs, the main sensor 1010 and the backup sensor 1011 located at different locations in the same area will almost simultaneously sense vibrations with very similar timeliness and magnitude. Therefore, comparing the common correlation between the first and the second signals S1/S2 can determine whether an earthquake occurs. According to an embodiment of the present invention, the first signal S1 is synchronously transmitted to the determining module 1021 and the prediction module 1022, and the second signal S2 is transmitted to the determining module 1021, so that these two modules having independent functions can execute their respective tasks synchronously. According to an embodiment, the determining module 1021 sends an earthquake event determining signal EEV2 to indicate whether there is an earthquake event. For example, if the earthquake event determining signal EEV2 is 1, it means that the determining result shows that there is an earthquake event. The determination module 1021 provides a real-time determination of whether there is an earthquake event, which can avoid false alarms caused by false messages.

The prediction module 1022 receives the first signal S1 and estimates the real-time seismic transverse wave prediction characteristic value ESV2 of the upcoming seismic transverse wave accordingly. According to an embodiment, the first signal S1 includes longitudinal wave acceleration data in various directions on the ground surface, such as acceleration data in at least one of the horizontal direction or the vertical direction, and the real-time seismic transverse wave prediction characteristic value includes a maximum ground surface acceleration value and a maximum ground surface velocity value. This characteristic parameter is usually regarded as an important indicator for measuring the seismic intensity level by various countries.

Referring to FIG. 1 again, when the earthquake event determining signal EEV2 sent by the determining module 1021 shows the existence of an earthquake event, the computing module 102 can send the real-time seismic transverse wave prediction characteristic value ESV2 to a predetermining unit to provide earthquake warnings. Because the determining module 1021 and the prediction module 1022 in the computing module 102 operate in parallel, the earthquake warning information (such as the real-time prediction characteristic value of the seismic transverse wave ESV2) can be provided to each unit in the area in a short period of time to perform disaster prevention actions.

Figure 2:
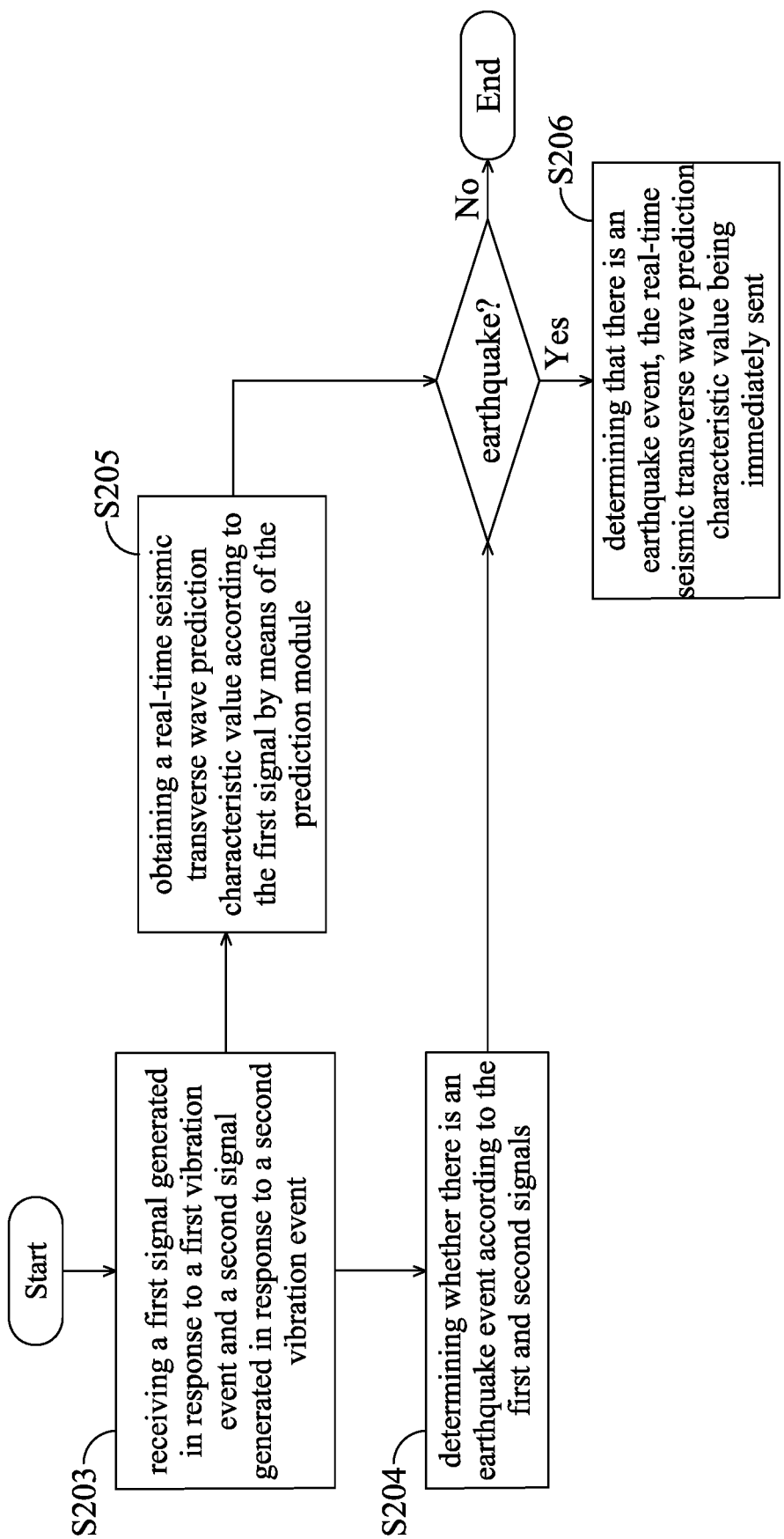
FIG. 2 is a schematic diagram showing a single execution of a method for determining earthquakes and estimating the seismic wave intensity for an on-site type according to a preferred embodiment of the present invention.

According to another point of view, refer to FIG. 2 in conjunction with FIG. 1. FIG. 2 is a schematic diagram showing a single execution of a method for determining earthquakes and estimating the seismic wave intensity for an on-site type according to a preferred embodiment of the present disclosure, including the following steps. When an earthquake or a similar event occurs, the earthquake determining method proposed in the embodiment of the present invention can receive a first signal S1 generated in response to a first vibration event PM1, and a second signal S2 generated in response to a second vibration event PM2 through an appropriate device (Step S203). It should be noted that the first and second signals S1/S2 come from earthquake detection devices at different locations, which can detect vibration waves generated by earthquakes. If the first and second vibration events PM1/PM2 are caused by an earthquake event, then the first and second signals S1/S2 measured by the earthquake detection devices at different locations should have similar properties, or it can be said that the data such as the timing and amplitude of the ground surface vibrations from the two signals should be closely related. Therefore, the embodiment of the present invention can determine whether there is an earthquake event according to the first and the second signals S1/S2 (Step S204). This can avoid the possibility of misjudging ordinary ground vibration events as earthquakes, and even triggering false alarms.

The method for determining the earthquake and estimating the seismic wave intensity for an on-site type in the embodiment of the present invention is to simultaneously perform the determining of whether it is an earthquake event, and estimate the magnitude of the earthquake. That is, while performing Step S204, the prediction module 1022 can be used to estimate a real-time seismic shear wave estimation characteristic value ESV2 according to the first signal S1 (Step S205), but is not limited to estimating the maximum ground surface acceleration value caused by the shear wave according to the acceleration-related parameters of the longitudinal wave; when the method of Step S204 is used to determine that there is an earthquake event, the real-time seismic shear wave estimated characteristic value is immediately sent (Step S206).

Since Steps S204 and S205 are synchronously operated, compared with the pre-or-post prediction method, the earthquake warning information (such as the real-time seismic transverse wave prediction characteristic value ESV2) can be provided immediately for disaster prevention actions for each unit in the area. Moreover, no matter what the prediction characteristic value ESV2 of the real-time seismic transverse wave estimated in Step S205 is, if the determining result of Step S204 is not an earthquake event, the estimated value will not be sent out to avoid triggering a false alarm. Therefore, the overall comprehensiveness of the early warning system using this embodiment can also be effectively improved.

Figure 3:
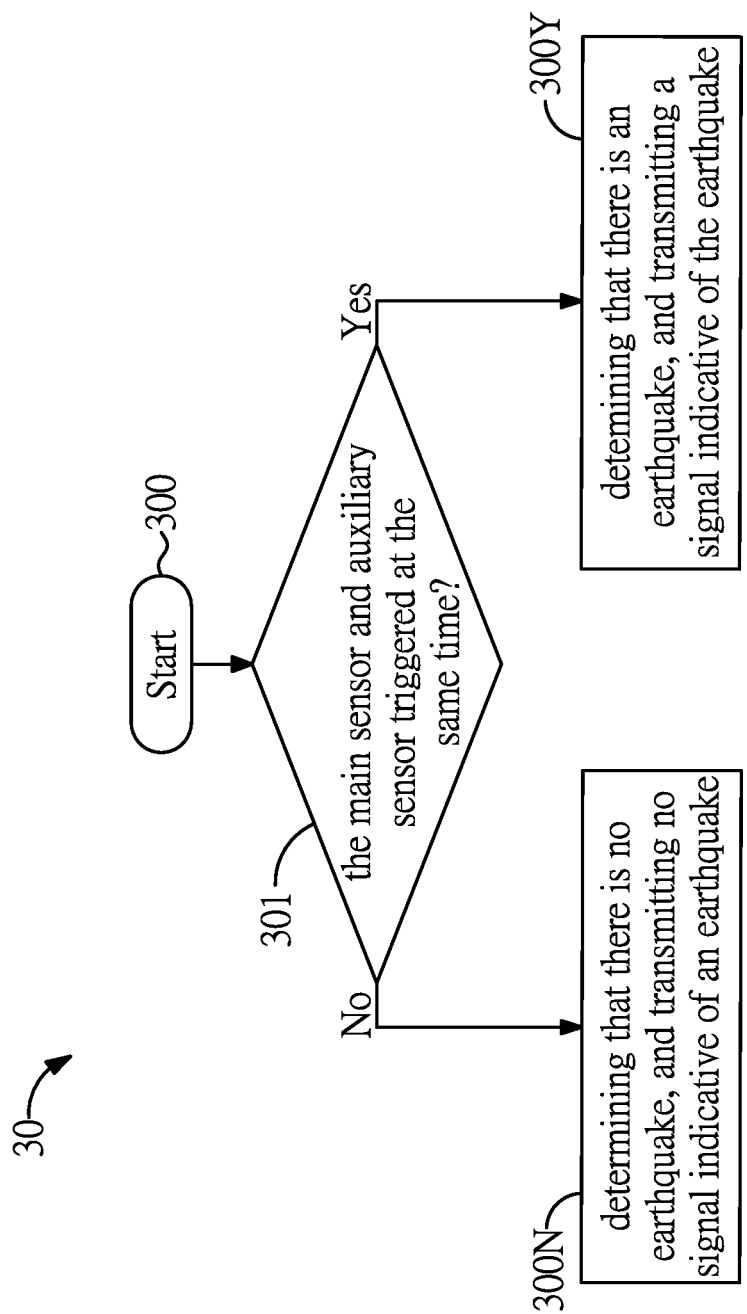
FIG. 3 is block diagram of the earthquake determination process according to a preferred embodiment of the present invention.

Please refer to FIG. 3 illustrating the earthquake determination process 30. In Step 300 which is "Start", the system test is completed, and each sensor and the host (not shown in FIG. 3) are in a normal power-on condition and are electrically powered. Then, the process proceeds to Step 301 (which is a determining step): determine whether the main sensor and remote signal source cause the host to determine that there is an earthquake at the same time. If the main sensor and remote signal source trigger the host to determine that there is an earthquake at the same time, the process proceeds to Step 301Y: determine that there is an earthquake and transmit a signal indicative of the earthquake. If the main sensor and the remote signal source do not trigger the host to determine that there is an earthquake at the same time, the process proceeds to Step 301N: determine that no earthquake occurs and transmit no signal indicative of an earthquake. Triggering at the same time substantively means triggering within a specific time length which can be, e.g. six seconds, or less or more. Furthermore, the remote signal source is connected to the host via an internet to transmit a remote signal to the host. If the remote signal source is a backup sensor, the remote signal represents a measurement value, which will be used by the host for calculation to obtain an acceleration signal, a velocity signal, or a displacement signal. If the remote signal source is a backup earthquake detection system, the remote signal is a trigger signal.

Figure 4:
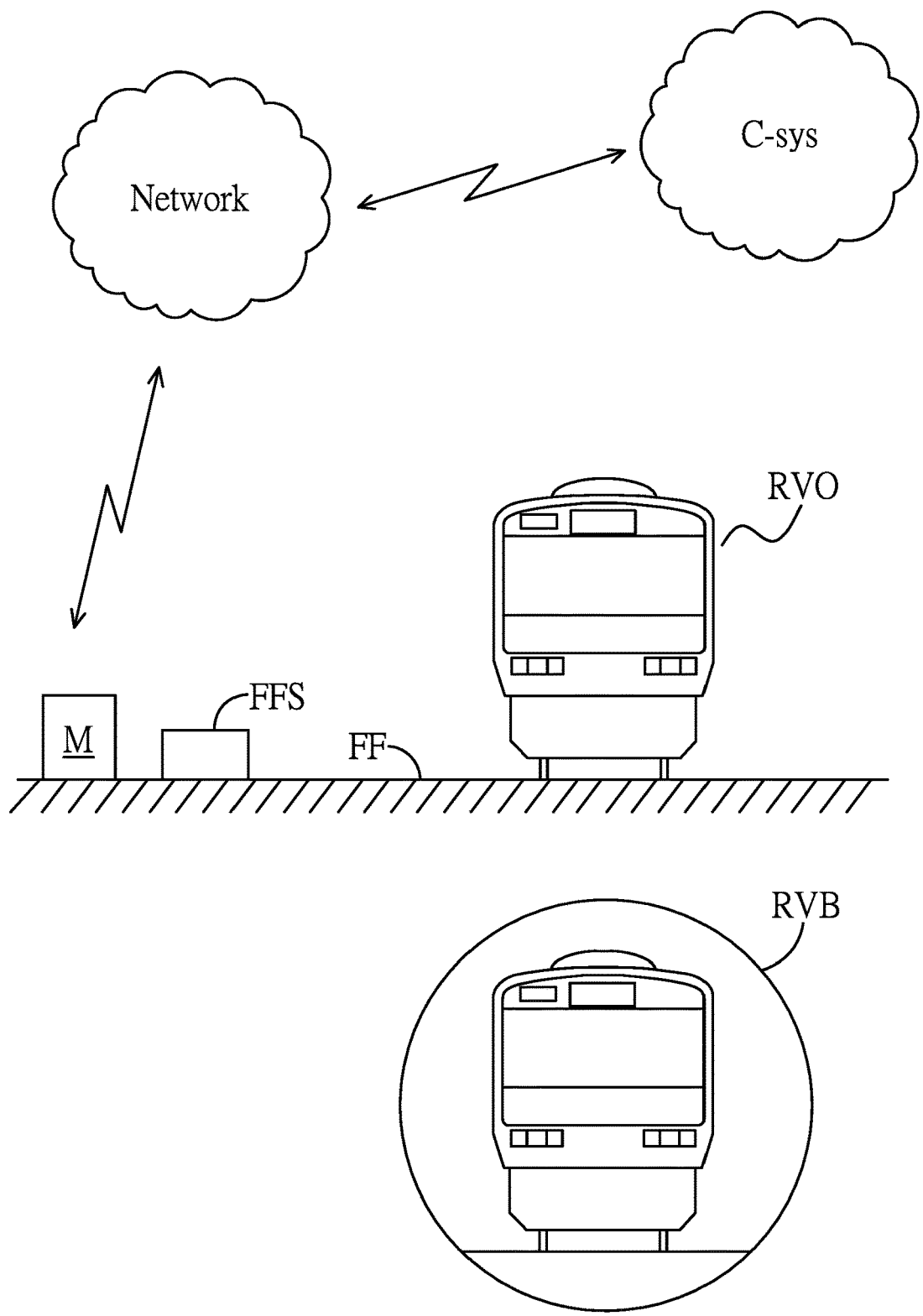
FIG. 4 is a schematic diagram illustrating the combined arrangement of the free field and remote signal source and its earthquake detection system according to a preferred embodiment of the present invention.

Please refer to FIG. 4 which is a schematic diagram illustrating the combined configuration of the free field and the remote signal source and its earthquake detection system according to an embodiment of the present invention. In FIG. 4, there are two types of ways to arrange and connect the sensors. In the free field FF, the free field sensor FFS (main sensor) is arranged. The free field FF generally includes the space on the ground and the space within two meters below the ground for the arrangement. In addition, there can be a host M arranged in the free field FF. The host includes a computing unit, transmitting interface, or communication interface (not shown in the figure). The host M can be arranged outdoors, or arranged in a structure (not shown in the figure) in a protected field. The sensors are sometimes susceptible to non-earthquake, artificial vibrations, such as the vibrations caused by the rail vehicle. This type of artificial vibration typically has a large amplitude, a low frequency, and a strong penetrating power. Therefore, to avoid these interferences, the sensors should be arranged in a sufficiently long distance. In addition, because the signal transmitted by the signal line of the sensor is an analog signal, the strength of the signal will greatly attenuate due to the long distance. Therefore, when the sensor used as a backup sensor is arranged in a distance up to hundreds of meters to avoid the interferences, the sensing signal of this backup sensor can be transmitted via an internet to prevent it from being influenced by the signal attenuation resulting from the physical line.

Please still refer to FIG. 4. The remote signal source can be another earthquake detection system C-sys (i.e. having its own host) to serve as a remote system. That is, the remote signal source serves as an earthquake sensing signal source in a long distance and can be a sensor being a backup sensor for the local (on-site) place. The remote signal source can also be an earthquake detection system being a remote backup earthquake detection system C-sys for the local (on-site) place. The remote signal source, when being a remote backup earthquake detection system C-sys, transmits an outgoing remote signal which is a trigger signal. The remote signal source can be used in the following conditions: the field where the main sensors are arranged does not have enough regions and thus the backup sensor cannot be arranged in a slightly long horizontal distance; in the protected field, no deep well is available to arrange a sensor therein, so that if the artificial structure (especially the rail overpass or the tunnel structure where no structural sensor can be used) per se has a vibrating source (such as the rail vehicle) which will generate vibrations, no structural sensor can be used. In case of such unsuitable places above, the remote signal source can be utilized.

In addition, the remote signal source can be used as a backup for any other sensor suffering from a severe interference. In FIG. 4, the rail vehicle on or under the ground sometimes generates relatively low-frequency vibrations with a strong penetrating power to propagate over a long distance, so even if a deep well seismograph is used, the sensor may still suffer from serious noise interferences. Therefore, in addition to the main sensor FFS according to a normal arrangement, it is more appropriate to use the remote signal source DS in the arrangement. Accordingly, the remote signal source of the present invention is characterized in that, based on advantage of the long distance transmission via the internet, there can be a long distance from each backup sensor or the remote backup detection system (the remote backup earthquake detection system C-sys) to the on-site main sensor of the system. Therefore, there can be a connection to the host M via the internet to achieve the effect of rechecking whether an earthquake occurs. Additionally, the remote backup earthquake detection system C-sys per se is an on-site system and can have its own remote signal source.

Figure 5:
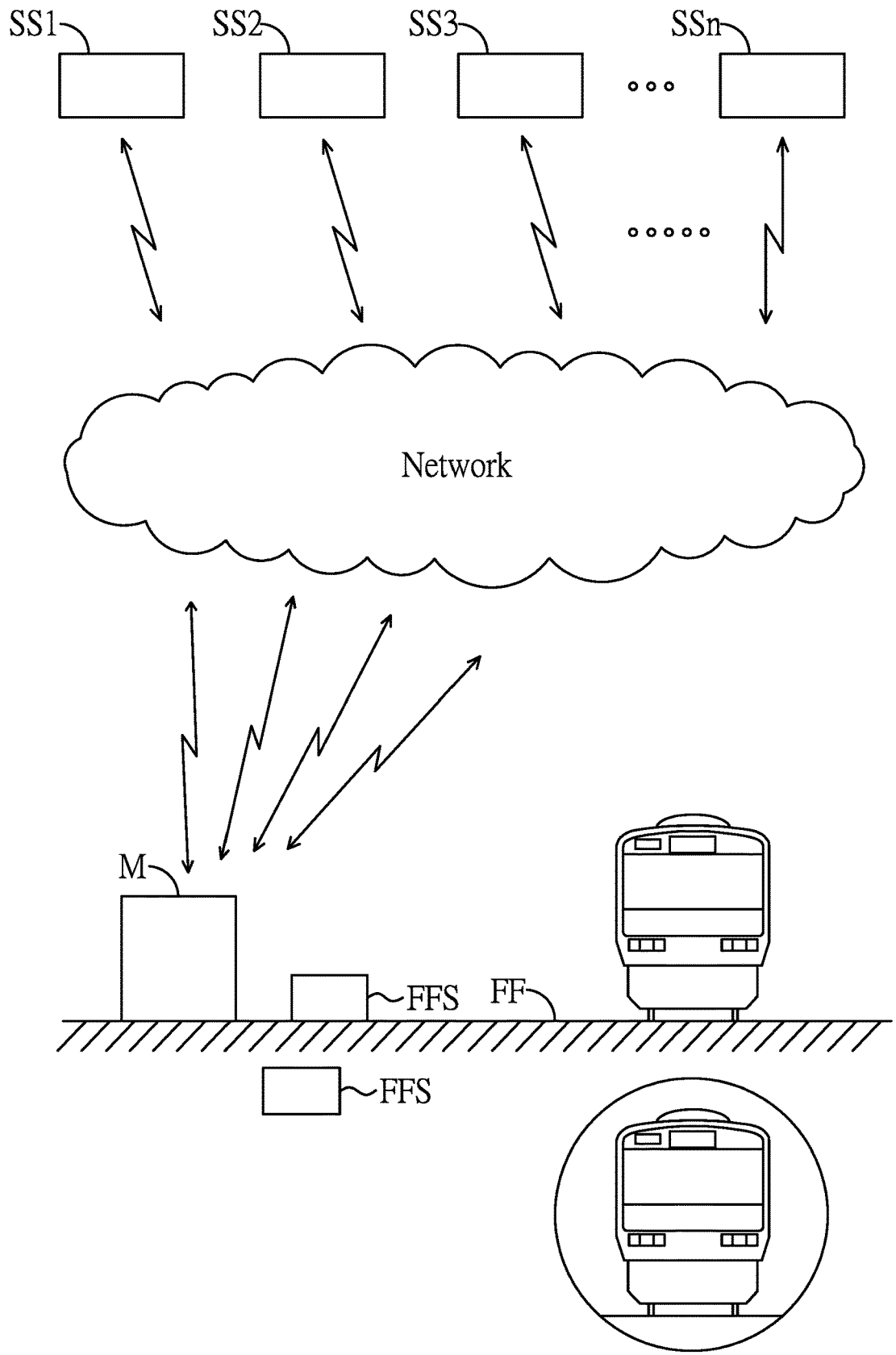
FIG. 5 is another schematic diagram illustrating the combined arrangement of the free field and remote signal source and its earthquake detection system according to a preferred embodiment of the present invention.

Please refer to FIG. 5 which is a schematic diagram illustrating a combined arrangement of the free field and remote signal source and its earthquake detection system according to an embodiment of the present invention. There are a first backup sensor SS1, a second backup sensor SS2, a third backup sensor SS3, a fourth backup sensor SS4, . . . , and an $N^{th}$ backup sensor SSn which are connected to the local host M via the internet connection. In the free field, a main sensor FFS is locally arranged on the ground or within two meters below the ground. FIG. 5 can be understood as illustrating an embodiment where each backup sensor is an individual device serving as a remote signal source to transmit an earthquake sensing result to the local (on-site) host M via the internet. If there are a plurality of remote signal sources, the signal sources are remotely arranged (i.e., being arranged at a remote end) with respect to the main sensor. The plurality of signal sources can be arranged in the same field or different fields at the remote end. The remote end refers to the concept of being in a long distance, i.e., the remote signal source is in a long distance from the main sensor. The remote signal source, when being an backup sensor, transmits an outgoing remote signal representing a measurement value, with which the host makes a calculation to provide an acceleration signal, a velocity, or a displacement signal. In addition, the remote signal source, if having the capability of making a calculation, can autonomously convert the measurement value into an acceleration signal, a velocity signal, a displacement signal, two of them, or all of them, so as to be transmitted via an internet to the host.

Figure 6:
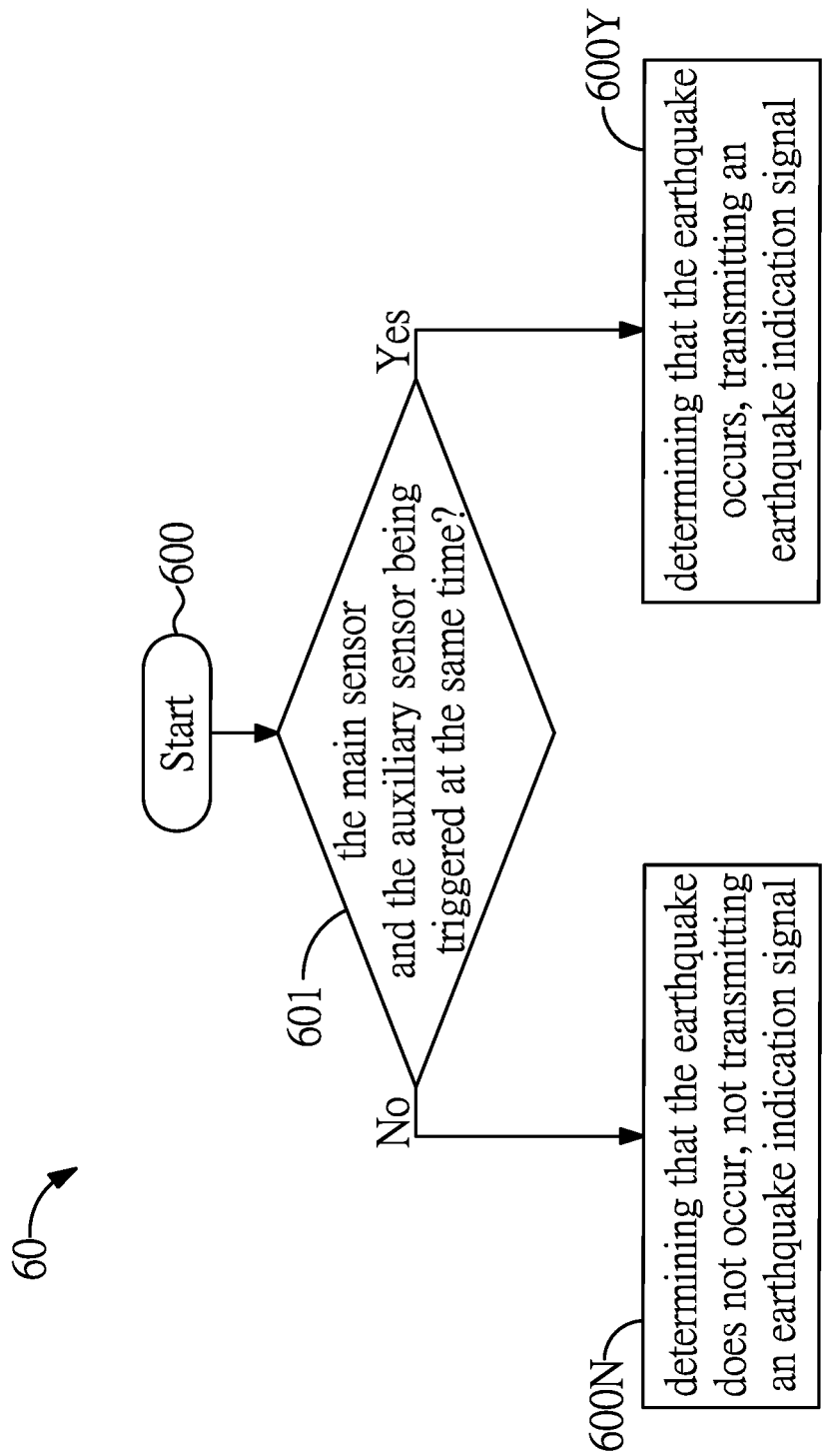
FIG. 6 is a block diagram showing earthquake determining blocks according to a preferred embodiment of the present invention.

Please refer to FIG. 6, which discloses the earthquake determination process 60, including the following steps. Step 600 is "start", which means that after the system test is completed, each sensor and the host (not shown in FIG. 6) are in a normal power-on state and electrically powered. Next, go to Step 601: whether the main sensor, the plurality of backup sensors, and the remote signal source confirm that there is an earthquake at the same time. This step refers to a determination step. If the main sensor, the plurality of backup sensors, and the remote signal source all make the host confirm that there is an earthquake at the same time, the process goes to Step 601Y: determining that an earthquake occurs, and transmitting an earthquake indicating signal. In addition, if the main sensor, the backup sensor, and the remote signal source do not make the host confirm that there is an earthquake at the same time, the process proceeds to Step 601N: determining that the earthquake does not occur, and the earthquake indication signal is not transmitted. The triggering at the same time mentioned here essentially refers to triggering within a specific time length, and the time length is six seconds or shorter. Furthermore, the remote signal source is connected to the host through the network, and transmits a remote signal to the host. If the remote signal source is a backup sensor, the remote signal is selected from an acceleration signal, a velocity signal, or a displacement signal. In addition, if the remote signal source is a backup earthquake detection system, the remote signal is a trigger signal.

Figure 7:
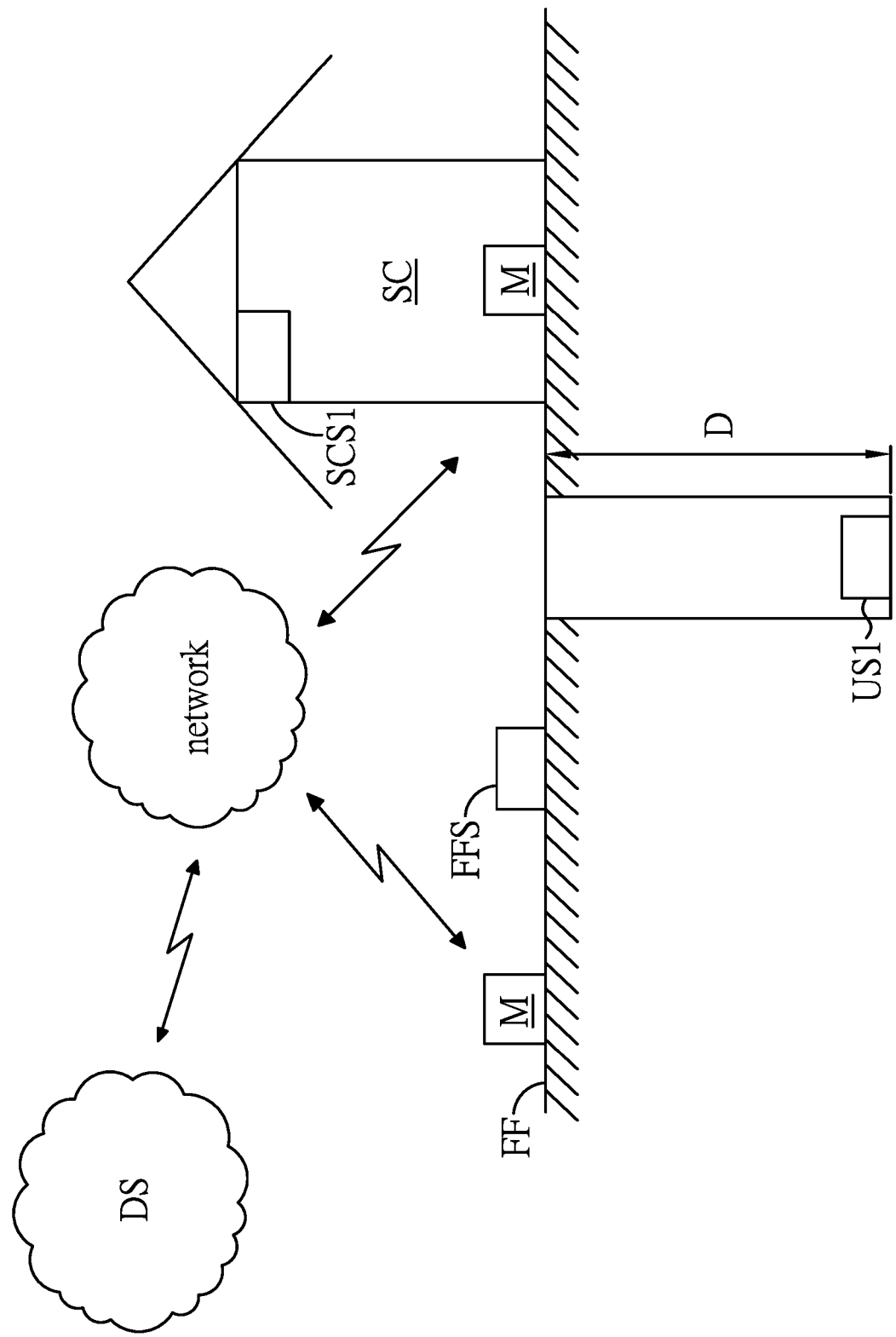
FIG. 7 is a schematic diagram showing the combined configuration of the free field sensor, the structure sensor, the deep well seismograph, and the remote signal source, and its earthquake detection system according to a preferred embodiment of the present invention.

Please refer to FIG. 7, which is a schematic diagram of the combined configuration of the free field sensor, the structural sensor, the deep well seismograph, and the remote signal source DS, and its earthquake detection system of an embodiment of the present invention. It can be seen that there are a total of four types of sensor configurations and connection methods. Firstly, the main sensor FFS (free field sensor) is disposed in the free field FF (free field, referring to the surface or a position very close to the surface). The free field roughly includes the space of the ground surface below and within two meters. The host M of the present embodiment is disposed in the free field FF, and the main sensor FFS is disposed next to the host M and is connected to the host M through a physical line. The host also includes a computing unit, a transmission or communication interface, etc. (not shown in the figure). Generally speaking, in order to facilitate adjustment and maintenance, the host M and the main sensor FFS will be disposed on the ground surface. The main sensor FFS disposed within a depth of two meters below the ground surface is called a shallow well sensor. The reason for utilizing the shallow well sensor is because sometimes the ground surface is susceptible to improper external forces. When being on the side of the school's sports field, there may be disturbances caused by various sports balls and sports apparatus, so that the probability of the sensor's misjudgment will be increased. Therefore, it is necessary to avoid these disturbances. However, if the sensor is disposed too deep below the ground surface FF, the deployment cost will be too high, so the main sensor FFS can be disposed within at most a depth of about two meters below the ground surface to avoid high construction costs and the difficulty of maintenance and adjustment. In addition, the host M can also be disposed in a structure in the protected field, such as a school, a residence, a commercial building, an indoor place, etc. Furthermore, in order to avoid the interference from buildings where human activities take place, etc., the horizontal distance from the free-field sensor FFS to the structures, or artificial constructions in the protected area should be at least 10 meters, preferably 30 meters, more preferably even farther.

Please continue to refer to FIG. 7, which also discloses a deep well seismograph US1 located in a deep well. The depth D of the deep well in the present embodiment is about twenty meters, and can reach a depth of up to fifty meters if circumstances permit. The reason for disposing the deep well seismograph US1 is to keep away from artificial vibration sources of roads by means of a vertical distance because the hinterland of the protected area is insufficient in many cases, so that the horizontal distance from the main sensor FFS to various buildings and structures in the protected area is short, and thus there is often the disturbance by vehicles passing by on the road. In addition, in order to save costs, the depth D of the respective deep well is mostly within 50 meters. However, due to the influence of the geology sometimes, e.g. the position of the batholith being relatively high, if the depth is less than 50 meters or even less than 20 meters, the deep well seismograph US1 is directly disposed on the batholith.

Please continue to refer to FIG. 7, which also discloses a structural sensor SCS1 located on the structure SC; generally speaking, it is disposed at the beam, the column, or the beam-column connection of the structure SC, which is for enabling the shock wave to be transmitted to the structural sensor SCS1 through the beam-column system. If there are no machines and appliances that generate huge vibrations in the building, the magnitude of the vibrations generated by humans themselves is limited. In addition, the vibrations generated by moving the furniture and electrical equipment, though being larger than those by humans walking, running, or jumping, will not be transmitted outside the building to trigger the free-field sensor FFS. The vibration amplitude of the compressor of the refrigeration and air-conditioning equipment is also small, and usually the machine itself has a shock-absorbing pad to greatly reduce the vibration transmission. The quite constant vibration pattern can be excluded by the system of the present embodiment, so it will not cause any interference to the structural sensor SCS1. For example, the structural sensor SCS1 can be applied to a structure such as a building in a dense area of administrative agencies and financial institutions according to the present embodiment. In addition, in order to further avoid human interferences, the structural sensor SCS1 can also be disposed on the top floor of the structure SC, such as a roof, and, preferably, it is disposed on the top of the column.

Please continue to refer to FIG. 7, which discloses the remote signal source DS, which may include one or more remote sensors as backup sensors, with its horizontal distance being away from the protected object possibly in a range from dozens of meters to hundreds of meters, or even three or four kilometers. In addition, the remote signal source DS can also be another earthquake detection system to serve as a remote backup earthquake detection system. That is, the remote signal source DS has its own host to be a remote system; it is connected to the host of the present embodiment through the internet. That is, the remote signal source DS is used as a remote earthquake sensing signal source, which can be a sensor being a backup sensor relative to the on-site earthquake detection system. The remote signal source DS can also be an earthquake detection system, which is a remote backup earthquake detection system relative to the on-site earthquake detection system. The timing of using the remote signal source DS is as follows: the hinterland of the protected field is not enough so that the backup sensor cannot be set in a far enough horizontal distance; the structural sensor SCS1 is often interfered with; or the depth of the deep well seismograph US1 is less than 20 meters. If there are the inappropriate places above, the remote signal source DS can be used. When there are multiple remote signal sources, it means that these signal sources are all disposed remotely relative to the main sensor. In other words, they are disposed at the remote end, but the multiple signal sources can be in the same field or different fields at the remote end. The remote end is a concept of a long distance, meaning that there is a long distance between the signal source of the remote end signal source and the main sensor. If the present embodiment is applied to buildings in densely populated areas such as administrative agencies and financial institutions, the structural sensor SCS1 can be used because there are few instruments that produce violent vibrations inside such structures. The purpose of using the deep well seismograph US1 is to avoid the vibration interference of large and heavy vehicles. The main sensor FFS can be used as a disposed point of the host. In addition, the remote signal source DS can be used as a backup in case other sensors fail. It can be seen that the structural sensor SCS1, the deep well seismograph US1 and the remote signal source DS are all used as backup sensors. Therefore, when each backup sensor and the main sensor determine the earthquake event has happened in a specific time length, the host sends an earthquake alarm.

Based on the above, the present disclosure provides an innovative concept, so that when an earthquake occurs, the characteristic values of the seismic transverse waves predicted reliably by the on-site earthquake prediction technology in real time according to the real-time longitudinal wave measurement data can be provided to meet the needs of the contingency. In addition, the present disclosure utilizes various sensors to achieve the effect of determining whether an earthquake occurs in a backup manner. If the hinterland is large enough, the backup sensor can be arranged in a longer horizontal distance. If there are vibrating sources (such as the rail structure, heavy industry plant, mining area, waterfall, etc.) generating interferences in a large range, the remote signal source can be used for effectively keeping the various interferences away. When a vibration event occurs, if the local main sensor and the remote backup sensor or the remote backup earthquake detection system C-sys both determine that the vibration event is an earthquake within a specific time length, the local host send an earthquake alarm. By means of the various configurations of the earthquake sensors, the accuracy in determining the occurrence of the earthquake can be improved. Based on limitations in the place where the main sensor is disposed, a plurality of appropriate remote backup sensors are provided to form the configuration. When the possibility of erroneously determining that the earthquake occurs is reduced, there will be fewer occurrences of downtime and material stopping, and thus there will be fewer delays or waste that can result therefrom. For the railway facility, the time cost resulting from the vehicle stopping or speed reduction can be decreased. Furthermore, because the possibility of making the erroneous determination can be reduced, there will be fewer conditions resulting therefrom to take evacuation measures, and thus the losses that can result from taking the disaster refuge can be reduced. The present disclosure also uses sensors with different configurations to achieve the effect of assisting in determining whether an earthquake has occurred. Of course, it is indeed worthy of providing protection and early warning with a sufficient budget to apply "the combined configuration of the free field sensor, the structural sensor, the deep well seismograph, and the remote signal source, and its earthquake detection system" of the present disclosure to buildings in densely populated areas of administrative agencies and financial institutions, so that the protected objects can be provided with as many protection configurations as possible. When one of the backup sensors is faulty or cannot be connected, the rest can still achieve the effect of rechecking whether an earthquake has occurred. Generally speaking, if the hinterland is large enough, the main sensor can be disposed at a longer horizontal distance. If there will be interference from vehicles near the structural sensors, the deep well seismographs can be set up to keep the interference away through a longer vertical distance. Structural sensors can be provided if there is no vibration-generating machinery within the structure. In addition, with the addition of a remote signal source, various interferences can be kept away more effectively. Through the configuration of various earthquake sensors in the present disclosure, the misjudgment rate of earthquake predictions can be further reduced, and a suitable number of sensors can be provided to form a configuration according to the protected field restrictions, which avoids being out of service due to the failure of any one sensor. Furthermore, since the rate of misjudgment is reduced, the economic loss caused by the suspension of work due to misjudgment can be reduced, and the inconvenience and false alarm caused by taking evacuation measures due to misjudgment can also be reduced, thereby improving the quality of life. In other words, the rate of misjudgment is lower, the number of evacuation measures taken due to misjudgment will be reduced, and the losses caused by these evacuation measures will also be reduced. It can be seen that the present disclosure has made great contributions to related industries.

While the invention has been described in terms of what is presently considered to be the most practical and preferred embodiments, the embodiments disclosed in the FIG. 1 to the FIG. 7 can be combined in an appropriate manner to achieve a synergistic effect. It is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

Embodiments

1. An earthquake detection system based on a combined configuration of a free field and a remote signal source, comprising: a host; a main sensor arranged in the free field and connected to the host; and a backup earthquake detection system remotely arranged with respect to the main sensor, connected to the host via an internet and transmitting a remote signal to the host.

2. The earthquake detection system according to Embodiment 1, wherein the remote signal is a trigger signal.

3. An earthquake detection system based on a combined configuration of a free field and a remote signal source, comprising: a host; a main sensor arranged in the free field and connected to the host; and a plurality of backup sensors remotely arranged with respect to the main sensor, wherein each of the backup sensors is connected to the host via an internet and transmits a remote signal to the host.

4. The earthquake detection system according to Embodiment 3, wherein the remote signal represents a measurement value.

5. A combined configuration of a free field and a remote signal source applied to an earthquake detection system, comprising: a main sensor arranged in a free field as a free field sensor; and a remote signal source arranged at a remote end with respect to the main sensor, and outputting a remote signal via an internet, wherein a sensing signal of the main sensor and the remote signal both arrive at the same receiving device.

6. The earthquake detection system according to Embodiment 5, wherein the remote signal represents a measurement value if the remote signal source is a backup sensor.

7. The earthquake detection system according to Embodiment 5, wherein the remote signal is a trigger signal if the remote signal source is a backup earthquake detection system.

8. The earthquake detection system according to Embodiment 5, wherein the earthquake detection system determines that there is an earthquake if the main sensor and the remote signal source both determine that there is an earthquake within a specific time length.

9. An earthquake detection system comprising the configuration according to any one of Embodiments 5-8.

What is claimed is:

1. An earthquake detection system configured with combination of a free field and a remote signal source, comprising:
  a host;
  a main sensor arranged in a free field and connected to the host; and
  a backup earthquake detection system remotely arranged with respect to the main sensor, connected to the host via an internet and transmitting a remote signal to the host, wherein:
  the backup earthquake detection system is an on-site system and has a remote signal source; and
  the remote signal is a trigger signal.

2. An earthquake detection system configured with combination of a free field and a remote signal source, comprising:
  a host;
  a main sensor arranged in the free field and connected to the host; and
  a plurality of backup sensors remotely arranged with respect to the main sensor, wherein each of the backup sensors is connected to the host via an internet and transmits a remote signal to the host,
  wherein one of the backup sensors is used to perform the function of the main sensor when the main sensor fails.

3. The earthquake detection system as claimed in claim 2, wherein the remote signal represents a measurement value.

4. A combined configuration of a free field and a remote signal source applied to an earthquake detection system, comprising:
  a main sensor arranged in a free field as a free field sensor; and
  a remote signal source arranged at a remote end with respect to the main sensor, and outputting a remote signal via an internet, wherein a sensing signal of the main sensor and the remote signal both arrive at the same receiving device, wherein the earthquake detection system determines that there is an earthquake if the main sensor and the remote signal source both determine that there is an earthquake within a specific time length.

5. The configuration as claimed in claim 4, wherein the remote signal represents a measurement value if the remote signal source is a backup sensor.

6. The configuration as claimed in claim 4, wherein the remote signal is a trigger signal if the remote signal source is a backup earthquake detection system.

7. An earthquake detection system configured with combination of a free field and a remote signal source, comprising:
 a main sensor arranged in a free field as a free field sensor; and
 a remote signal source arranged at a remote end with respect to the main sensor, and outputting a remote signal via an internet, wherein a sensing signal of the main sensor and the remote signal both arrive at the same receiving device, wherein:
 the remote signal source includes remote sensors serving as backup sensors;
 the remote signal source has a horizontal distance being away from a protected object in a range from dozens of meters to hundreds of meters; and
 the earthquake detection system determines that there is an earthquake if the main sensor and the remote signal source both determine that there is an earthquake within a specific time length.

8. The earthquake detection system as claimed in claim 7, wherein the remote signal is a trigger signal if the remote signal source is a backup earthquake detection system.

\* \* \* \* \*